United States Patent Office 2,837,485
Patented June 3, 1958

2,837,485

PROCESS FOR COLORING ORGANIC MATERIALS WITH FLUORESCENT STYRYL PYRAZOLINE DYESTUFFS AND COMPOSITIONS CONTAINING SAME

Adolf-Emil Siegrist, Basel, Switzerland, assignor to Ciba Limited, Basel, Switzerland, a Swiss firm No Drawing. Application December 7, 1953
Serial No. 396,793

Claims priority, application Switzerland
December 18, 1952

15 Claims. (Cl. 252—301.2)

This invention is based on the observation that colored pyrazoline derivatives, which fluoresce in solution or on a substratum and correspond to the general formula $$Ar_1-CH=CH-\underset{\underset{\underset{Ar}{N}}{\overset{|}{N}}}{\overset{\|}{C}}-CH_2\diagdown CH-R_1$$

in which Ar and $Ar_1$ represent aromatic radicals which may contain substituents, and $R_1$ represents a hydrogen atom or a hydrocarbon radical, are valuable fluorescent dyestuffs.

Water-soluble or water-insoluble compounds of the above general formula may be used. The water-insoluble compounds can be made by methods in themselves known from ketones of the formula $$Ar_1-CH=CH-CO-CH=CH-R_1$$

and aryl-hydrazines of the general formula $$Ar-NH-NH_2$$

There is obtained, for example, from dibenzal-acetone and phenyl-hydrazine the valuable compound 1:5-diphenyl - 3 - styryl - pyrazoline. The water-soluble compounds can be obtained either from a ketone and a hydrazine at least one of which contains a group imparting solubility in water, or by subsequently introducing such a group into the pyrazoline. Two processes for making the derivatives containing sulfonic acid groups are the following:

(a) Pyrazoline derivatives of the first mentioned formula which do not contain any sulfonic acid group are treated with sulfonating agents.

As sulfonating agents, with which the pyrazoline compounds are to be treated, there come into consideration sulfuric acid, sulfuric acid containing sulfur trioxide, that is to say, oleum of various strengths, chlorosulfonic acid or solutions of sulfur trioxide in an inert organic solvent, such as methylene dichloride. There may also be used mixtures of different sulfonating agents. The reaction with the sulfonating agent is advantageously carried out under conditions which are as mild as possible. Advantageously, the sulfonation is conducted at a temperature below 50° C., and especially at temperatures below 30–35° C. The quantity of the sulfonating agent to be used depends on how many sulfonic acid groups are to be introduced. The reaction period and reaction temperature are also adjusted to suit the particular circumstances.

(b) A ketone of the general formula $$Ar_1-CH=CH-CO-CH=CH-R_1$$

or an addition product thereof with dialkylamines of the general formula $$Ar_1-CH=CH-CO-CH_2-CH(R_1)-N\diagup\begin{subarray}{l}R_2\\R_3\end{subarray}$$

in which $R_2$ and $R_3$ represent lower alkyl radicals, is reacted with an aryl-hydrazine of the general formula $$Ar-NH-NH_2$$

Ar, $Ar_1$ and $R_1$ in these formulae representing the above radicals, at least one of which contains a sulfonic acid group.

The condensation may be carried out in an alkaline or acid medium, and advantageously the condensation is carried out in an aqueous acid medium. In order to produce an acid reaction there may be used an organic or inorganic acid. There may be mentioned, for example, acetic acid, formic acid, hydrochloric acid and sulfuric acid.

The radicals Ar and $Ar_1$ in the above general formula may be mononuclear or poly-nuclear. There may be mentioned, for example, phenyl, diphenyl, diphenyl ether and naphthalene radicals, which may be unsubstituted or contain alkyl, alkoxy, amino, alkylated or acylated amino groups, sulfonic acid groups or halogen atoms. The radical $R_1$ may represent, apart from hydrogen, an alkyl, aryl or aralkyl group which may be unsubstituted or substituted, for example, a methyl, ethyl, phenyl, benzyl or naphthyl group. Especially valuable are the products in which the radical $R_1$ represents an aromatic radical.

The pyrazoline derivatives can be used in a very wide variety of ways in accordance with this invention. Water-soluble derivatives which possess sufficient affinity for nitrogenous fibers, can be used for dyeing such fibers, for example, wool, silk, polyamide fibers, casein fibers or fabrics made of mixtures of different nitrogenous fibers or fabrics made of mixtures of nitrogenous fibers and cellulose fibers. Compounds of strong coloring power may be used alone. Compounds of weak coloring power are advantageously used together with other dyestuffs, in which case the former compounds may impart enhanced brilliance to the latter dyestuffs. The water-insoluble compounds can be used for dyeing from organic solvents, for example, for dyeing in the spinning solution. Both kinds of compounds are also suitable for the production of prints. They can also be used together with a very wide variety of artificial resins for the production of fluorescent pigments, coatings, etc. For this purpose there may be used the artificial resins customarily used for making "luminous" dyestuff pigments, for example, condensation resins such as ureaformaldehyde resins, melamine-formaldehyde resins or phenol-formaldehyde resins or polymerization resins such as vinyl or acrylic resins, or even natural resins, or finally mixtures of different types of resins, the methods of working up and of application customary in this art being used.

The following examples illustrate the invention, the parts being by weight unless otherwise stated, and the relationship of parts by weight to parts by volume being the same as that of the kilogram to the liter:

*Example 1*

A solution of 0.4 part of the sodium salt of a sulfonated 1:5-diphenyl-3-styryl-pyrazoline in 5 parts of water is introduced, while stirring, into 40 parts of a 75 percent butanolic solution of a formaldehyde-urea condensation product etherified with butyl alcohol. The colored resin solution is condensed out for 3–4 hours at 135–140° C., and the hardened resin is then finely ground to form a pigment.

100 parts of the pigment so obtained are suspended in 1000 parts by volume of an alcoholic polyvinyl acetate lacquer, and applied by means of a spraying gun on to a white ground, such as paper, carboard or fabric, and the coating is dried in air.

The coating so produced exhibits an intense greenish yellow fluorescence in daylight or when exposed to ultraviolet rays, and has a good fastness to light.

Instead of the above mentioned alcoholic polyvinyl acetate lacquer, there may be used the same quantity of a lacquer made with a polymethacrylate or polystyrene resin or with nitrocellulose.

The sodium salt of the sulfonated 1:5-diphenyl-3-styryl-pyrazoline used in this example can be made as the formula follows: 20 parts of 1:5-diphenyl-3-styryl-pyrazoline of

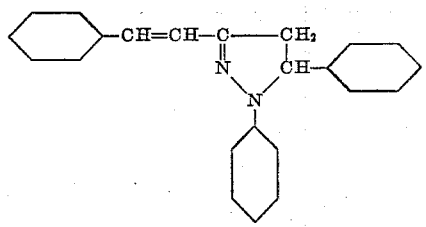

are introduced, while cooling and stirring well, into 184 parts of concentrated sulfuric acid in small portions in such manner that the temperature does not rise above 10° C. The whole is stirred for about one hour at such temperature until dissolution is complete. 95 parts of oleum (24 percent $SO_3$) are introduced dropwise in the course of 30 minutes, the final temperature being 35° C. The whole is then stirred for one hour at 30–35° C., the green reaction mixture is cooled to 10° C. and poured, while stirring, onto 500 parts of ice, whereby a clear yellow solution is obtained. The solution is neutralized, while cooling, with sodium hydroxide solution, and is then filtered to remove small amount of undissolved material and the filtrate is evaporated to dryness. The sodium salt of the sulfonated 1:5-diphenyl-3-styryl-pyrazoline is extracted from the residue by means of methanol at a raised temperature, the extract solution is filtered and the filtrate is evaporated to dryness. There is obtained a yellow powder, which yields a yellow aqueous solution and, when exposed to daylight or ultraviolet rays exhibits an intense greenish yellow fluorescence.

*Example 2*

A solution of 0.4 part of the yellow-dyeing dyestuff No. 934 in Schultz, Farbstofftabellen, 7th edition, and 0.6 part of the sodium salt of a sulfonated 1:5-diphenyl-3-styryl-pyrazoline in 10 parts of water is introduced, while stirring, into 50 parts of a solution of about 75 percent strength in butanol of a formaldehyde-urea condensation product etherified with butyl alcohol, and the further procedure is the same as that described in Example 1.

There is obtained a coating which has a more brilliant appearance than the coating produced with a resin which contains only 0.4 part of the aforesaid Schultz dyestuff No. 934.

*Example 3*

A solution of 0.6 part of 1-[4'-acetylamino-diphenyl-(4)]-3-styryl-5-phenyl-pyrazoline in 50 parts by volume of acetone is introduced while stirring into 50 parts of a solution of about 75 percent strength in butanol of a formaldehyde-urea condensation product etherified with butyl alcohol. The subsequent procedure is the same as that described in Example 1.

The coating so obtained has a brilliant yellow color and exhibits a powerful yellow fluorescence in daylight and when exposed to ultraviolet rays.

The aforesaid 1-[4'-acetylamino-diphenyl-(4)]-styryl-5-phenyl-pyrazoline can be made by heating 1 molecular proportion of dibenzal-acetone and 1 molecular proportion of 4'-acetylamino-diphenyl-hydrazine-(4') in glacial acetic acid for 2 hours on a boiling water bath.

*Example 4*

Wool is dyed for 30 minutes at 45–50° C. at a liquor ratio of 1:30 in a bath which contains, calculated on the weight of the fibre, 5 percent of formic acid and 1–3 percent of the sodium salt of a sulfonated 1:5-diphenyl-3-styryl-pyrazoline. The wool is then rinsed and dried. There is obtained a luminous yellow dyeing, which exhibits a powerful yellow fluorescence in daylight and when exposed to ultraviolet rays.

*Example 5*

Wool is treated for 30 minutes at a liquor ratio of 1:40 in a bath, having a temperature of 90–95° C., which contains per liter 1 gram of the sodium salt of a sulfonated 1-(para-chlorophenyl)-3-styryl-phenyl-pyrazoline, 0.75 gram of sulfuric acid and 2.5 grams of sodium sulfate. The material is then rinsed and dried. There is obtained a luminous yellow dyeing, which exhibits a strong yellow fluorescence in daylight and when subjected to ultraviolet rays.

What is claimed is:

1. A process for coloring organic material selected from the group consisting of fibrous organic material and resinous organic material with fluorescent dyestuffs, which comprises applying to the substratum to be colored a colored pyrazoline derivative, which fluoresces when applied to a substratum and corresponds to the general formula

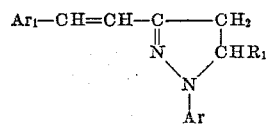

wherein Ar and $Ar_1$ each represents an aromatic radical of the benzene series and $R_1$ represents a member selected from the group consisting of hydrogen and a radical of the benzene series.

2. A process for dyeing nitrogenous fibers with fluorescent dyestuffs, which comprises dyeing the material with a water soluble colored pyrazoline derivative of the general formula

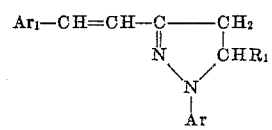

wherein Ar and $Ar_1$ each represents an aromatic radical of the benzene series and $R_1$ represents a member selected from the group consisting of hydrogen and a radical of the benzene series and wherein at least one of the radicals Ar, $Ar_1$ and $R_1$ contains a sulfonic acid group.

3. A process for dyeing nitrogenous fibers with fluorescent dyestuffs, which comprises dyeing the material with a water soluble colored pyrazoline derivative of the general formula

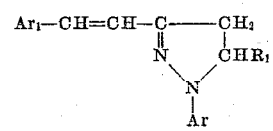

wherein Ar, $Ar_1$ and $R_1$ each represents a mononuclear carbocyclic aromatic radical, at least one containing a sulfonic acid group.

4. A process for dyeing wool with fluorescent dyestuffs, which comprises dyeing the material with the sodium salt of a sulfonated 1:5-diphenyl-3-styryl-pyrazoline.

5. A process for dyeing wool with fluorescent dyestuffs, which comprises dyeing the material with the sodium salt of a sulfonated 1-(parachloro-phenyl)-3-styryl-5-phenyl-pyrazoline.

6. A process for the manufacture of a fluorescent pigment from resinous organic material, which comprises incorporating into the said resinous organic material a fluorescent colored pyrazoline derivative of the general formula

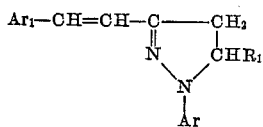

wherein Ar and Ar₁ each represents an aromatic radical of the benzene series and R₁ represents a member selected from the group consisting of hydrogen, and a radical of the benzene series.

7. A process for the manufacture of a fluorescent pigment from resinous organic material, which comprises incorporating into the said resinous organic material a fluorescent colored pyrazoline derivative of the general formula

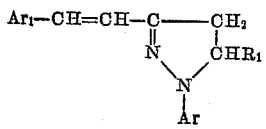

wherein Ar, Ar₁ and R₁ each represents a mononuclear carbocyclic aromatic radical, at least one containing a sulfonic acid group.

8. A process for the manufacture of a fluorescent pigment, which comprises incorporating into a solution of a urea-formaldehyde condensation product in butanol the sodium salt of a sulfonated 1:5-diphenyl-3-styryl-pyrazoline, hardening the resin and grinding the mass.

9. A process for the manufacture of a fluorescent pigment, which comprises incorporating into a solution of a urea-formaldehyde condensation product in butanol the sodium salt of a sulfonated 1:5-diphenyl-3-styryl-pyrazoline, and another non-fluorescent yellow-dyeing dyestuff, hardening the resin and grinding the mass.

10. A process for the manufacture of a fluorescent pigment, which comprises incorporating 1-[4'-acetylaminodiphenyl-(4)]-3-styryl-5-phenyl-pyrazoline into a solution in butanol, of a urea-formaldehyde condensation product etherified with butanol hardening the resin and grinding the mass.

11. A fluorescent pigment from a resinous organic material which contains incorporated therein a colored pyrazoline derivative, which fluoresces in solution or when applied to a substratum and corresponds to the general formula

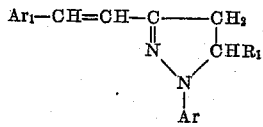

wherein Ar and Ar₁ each represents an aromatic radical of the benzene series and R₁ represents a member selected from the group consisting of hydrogen and a radical of the bengene series.

12. A fluorescent pigment made from an urea-formaldehyde resin which contains incorporated therein a colored pyrazoline derivative, which fluoresces when applied to a substratum and corresponds to the general formula

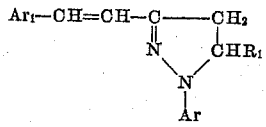

wherein Ar, Ar₁ and R₁ each represents a mononuclear carbocyclic aromatic radical at least one containing a sulfonic acid group.

13. A fluorescent pigment made from an urea-formaldehyde resin which contains incorporated therein the sodium salt of a sulfonated 1:5-diphenyl-3-styryl-pyrazoline.

14. A fluorescent pigment made from an urea-formaldehyde resin which contains incorporated therein the sodium salt of a sulfonated 1:5-diphenyl-3-styryl-pyrazoline and another non fluorescent yellow-dyeing dyestuff.

15. A fluorescent pigment made from an urea-formaldehyde resin which contains incorporated therein 1-[4'-acetylamino-diphenyl-(4)]-3-styryl-5-phenyl-pyrazoline.

References Cited in the file of this patent
UNITED STATES PATENTS

| | | |
|---|---|---|
| 2,498,592 | Switzer | Feb. 21, 1950 |
| 2,639,990 | Kendall | May 26, 1953 |
| 2,640,056 | Duffin | May 26, 1953 |

OTHER REFERENCES

Straus et al.: Chem. Abstracts, vol. 13, pages 727–9, 1919.

UNITED STATES PATENT OFFICE
CERTIFICATE OF CORRECTION

Patent No. 2,837,485                                 June 3, 1958

Adolf-Emil Siegrist

It is hereby certified that error appears in the printed specification of the above numbered patent requiring correction and that the said Letters Patent should read as corrected below.

Column 2, line 68, for "carboard" read -- cardboard --; column 3, line 7, strike out "the formula" and insert the same after "pyrazoline of" in line 8, same column; column 5, line 44, after "butanol" insert a comma; column 6, line 11, for "bengene" read -- benzene --; line 24, after "radical" insert a comma.

Signed and sealed this 18th day of November 1958.

(SEAL)
Attest:

KARL H. AXLINE                                           ROBERT C. WATSON

Attesting Officer                                        Commissioner of Patents